Sept. 6, 1927.
C. ROMER
1,641,457
TIRE INFLATING MEANS
Filed Feb. 18, 1925
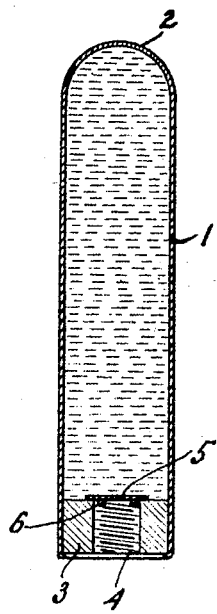
INVENTOR
Charles Romer
BY
Sigmund Herzog
ATTORNEY Patented Sept. 6, 1927.

1,641,457

UNITED STATES PATENT OFFICE.

CHARLES ROMER, OF NEWARK, NEW JERSEY.

TIRE-INFLATING MEANS.

Application filed February 18, 1925. Serial No. 10,035.

The present invention relates to improvements in means for inflating the inner tubes of pneumatic tires of vehicle wheels.

Pneumatic tires are usually inflated by means of a manually operated air pump, that is carried along in the tool kit or seat of the automobile, or by a power driven pump used for producing a supply of compressed air in a container at air supply stations. Inasmuch as an air supply station is not always available, it is obvious that, after a deflated inner tube of a tire has been repaired, it must be inflated by means of a hand-operated air pump. This operation is tiresome and, therefore, the source of great annoyance.

The main object of the present invention is to provide a tire inflating device that is very simple in construction, and of small compass, so that it can be carried along practically in the vest pocket of the user.

Another object of the invention is to produce a tire inflating means of the character mentioned which is inexpensive, so that it can be discarded after use.

A further object of the invention is to provide a device of the type mentioned which can be conveniently attached to or detached from the tire, the attaching operation rendering the same operative.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawing, which represents a longitudinal central section taken through a tire inflating device constructed in accordance with the present invention.

The tire inflating device comprises a, preferably, metallic container 1 of any suitable type and configuration. In the case illustrated a cylindrical container is shown, one end of which, denoted by the numeral 2, is closed by means made integral with the body portion of the container, while its other end is closed by a, preferably, metallic plug 3, having a central screw-threaded opening 4, extending therethrough. The threads of this opening fit the exterior threads on the valve stem of the inner tube of a tire. The opening in this plug is sealed in any suitable manner, for instance by a metallic disk 5, which is, preferably, soldered to the inner face of the plug. On the underface of this disk are formed a plurality of projections 6, which extend into the screw-threaded opening 4. The container is filled with a liquefied gas, which, upon liberation, is converted into gaseous state. The container is very small in size, sufficient to contain a few cubic centimeters of liquefied gas, which, when discharged from the container, provides sufficient gas to inflate the inner tube of a pneumatic tire.

As appears from above the device is in the form of a cartridge, that is provided as an article of commerce. In producing the same, the container is charged through its open end with the liquefied gas, the plug 3 with the seal 5 thereon being then inserted into the open end of the container, an airtight seal being provided in any suitable manner, for instance by crimping the open end of the cartridge over the plug, as shown in the drawing. If, for instance, liquid carbon dioxide is used, the latter must be chilled down below its boiling point at atmospheric pressure, that is, —8° C. (—108°.4 F.), whereby the cartridge may be filled at atmospheric pressure.

In use, the dust cap is removed from the valve stem of the inner tube, and the cartridge mounted on the said stem by engaging the threads of the opening 4 with the threads of the stem, and turning the cartridge until the stem breaks the solder joint between the disk 5 and the plug 3. When this occurs, the liquefied gas enters the inner tube, it being automatically converted into gas, which inflates the tire. The container is then removed from the tire and either thrown away or returned to the dealer supplying the cartridges.

The projections 6 are provided on the disk 5 in order to insure proper flow of the liquefied gas into the inner tube. It is obvious that, in screwing the container on the valve stem of the said tube, the walls of the stem come first into contact with the said projections, so that, when the container is further screwed down onto the said valve stem and the solder connection is only partly broken between the disk 5 and the lug 3, the liquefied gas is permitted to flow freely into the valve stem. If these projections were not present, it is obvious that, if the solder connection is only partly broken, the liquefied gas could escape around the outer surface of the valve stem.

What I claim is:—

1. A cartridge for inflating tires, comprising a container closed by a plug having a screw-threaded opening, the threads of said opening being adapted to mesh with those on the exterior surface of the valve stem of the inner tube of a tire, and a disk for closing said opening soldered to the inner face of said plug, the solder seal between said disk and said plug being adapted to be broken upon screwing said container onto the valve stem, said container holding a charge of liquefied gas.

2. A cartridge for inflating tires comprising a container having a discharge opening provided with threads adapted to mesh with those on the exterior surface of the valve stem of the inner tube of a tire, and a closure for said opening soldered to the inner face of said container, the solder seal between said closure and said container being adapted to be broken upon screwing said container onto the valve stem, said container holding a charge of liquefied gas.

Signed at Newark, in the county of Essex, and State of New Jersey, this 28th day of January, A. D. 1925.

CHARLES ROMER.